May 3, 1960        E. SINGER        2,935,083
PRESSURE REDUCING VALVE
Filed July 25, 1955        2 Sheets-Sheet 1
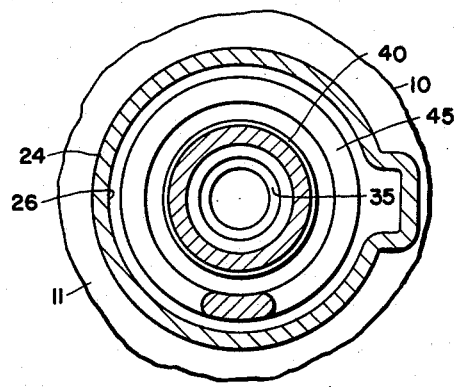
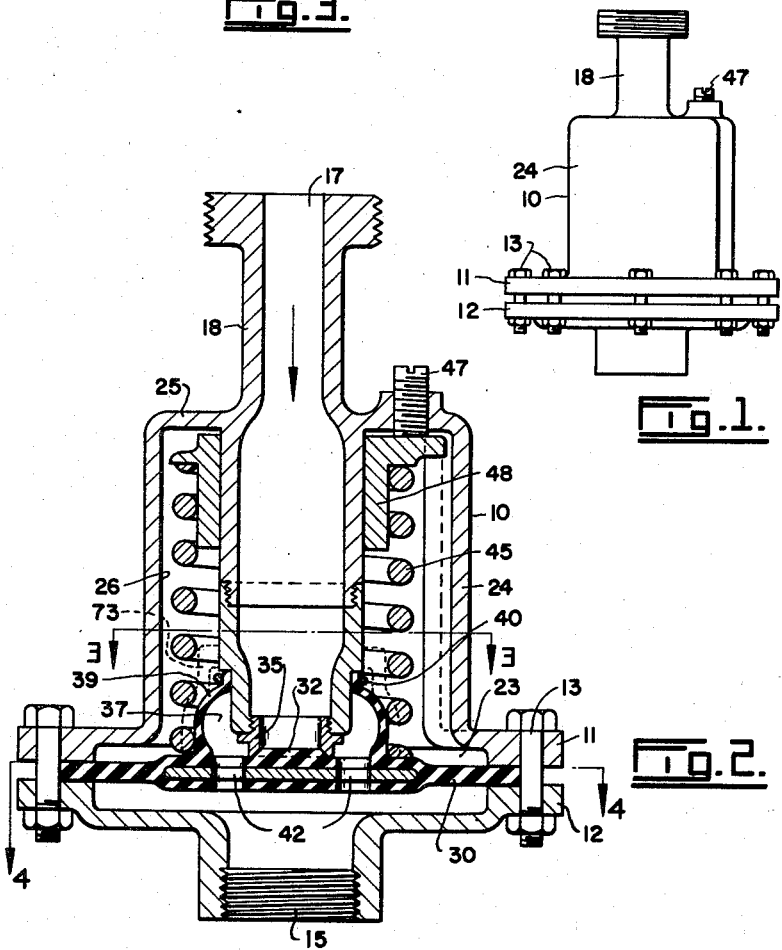
INVENTOR
ERNST SINGER
BY
Fetherstonhaugh & Co.
ATTORNEYS May 3, 1960   E. SINGER   2,935,083
PRESSURE REDUCING VALVE
Filed July 25, 1955   2 Sheets-Sheet 2
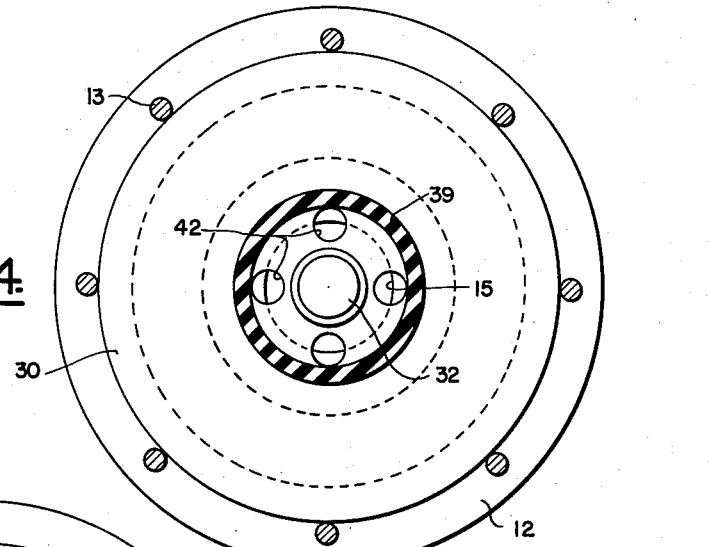
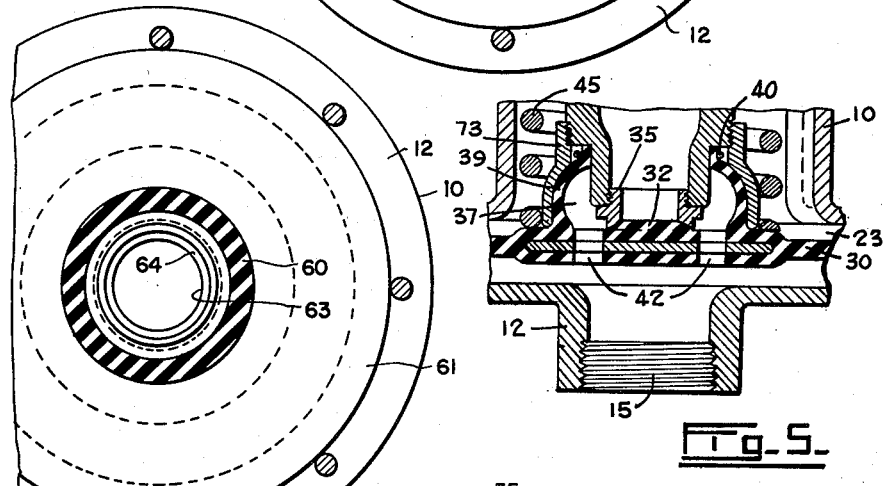
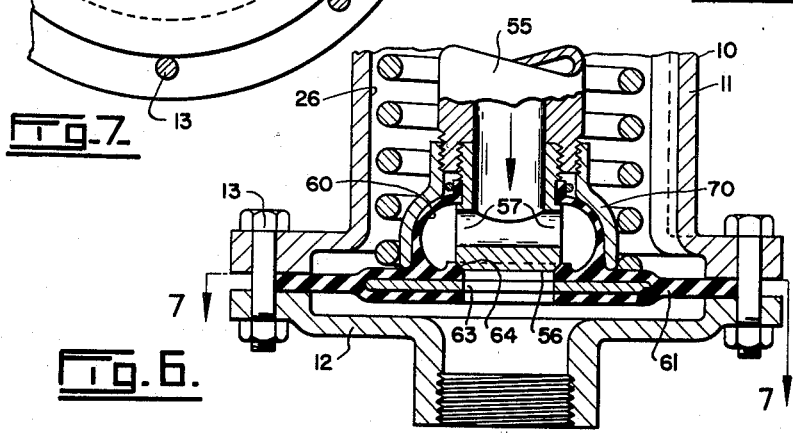
INVENTOR
ERNST SINGER
BY
Featherstonhaugh & Co.
ATTORNEYS

United States Patent Office 2,935,083
Patented May 3, 1960

2,935,083
PRESSURE REDUCING VALVE

Ernst Singer, Vancouver, British Columbia, Canada, assignor to Singer Valve Company Limited, Vancouver, British Columbia, Canada, a corporation of Canada Application July 25, 1955, Serial No. 524,187

8 Claims. (Cl. 137—505.25)

This invention relates to improved pressure reducing valves.

An object of the present invention is the provision of a pressure reducing valve which is considerably simpler in construction and operation than the valves now in common use.

Another object is the provision of a pressure reducing valve having with a given spring, a far greater range of adjustment than known valves.

Yet another object is the provision of a pressure reducing valve having no moving parts excepting a single diaphragm.

A further object is the provision of a pressure reducing valve having a linear flow characteristic which results in a minimum pressure drop across the valve.

The present valve includes a flexible diaphragm and a spring, the tension of which may be adjusted to regulate the outlet pressure of the valve. This valve with a given spring has a greater range of adjustment of outlet pressure than known valves. Furthermore, the inherent pressure drop across the valve is less than in the prior valves because of the linear flow characteristic of the former. For example, 100 lbs. gauge inlet pressure may be reduced to an outlet pressure of anywhere from 1 to 98 lbs. by means of one of these valves with a given spring.

A valve according to this invention includes a casing having a spaced inlet and outlet. A flexible diaphragm extends across the casing between the inlet and outlet. Confining means is connected to the diaphragm for directing fluid from the inlet against a small part only of the diaphragm, and the latter has at least one port therethrough within the confining means. Means is provided for preventing the flow of fluid from the inlet through the diaphragm port when the diaphragm is in a closed position. When the valve is in operation, the diaphragm is retained in its closed position by back pressure of fluid through the outlet against the diaphragm when said back pressure against a large portion of the diaphragm is greater than the fluid pressure against the small part of the diaphragm within the confining means. Any decrease in the back pressure from this point results in fluid flowing through the diaphragm port, said flow being regulated by the amount of the back pressure.

Examples of this invention are illustrated in the accompanying drawings, in which, Figure 1 is a reduced side elevation of a pressure reducing valve, Figure 2 is a vertical section through the valve illustrating one form of the invention, Figure 3 is a horizontal section taken on the line 3—3 of Figure 2, Figure 4 is a horizontal section taken on the line 4—4 of Figure 2, Figure 5 is a vertical section through a valve, illustrating a variation of the valve of Figure 2, Figure 6 is a fragmentary view similar to Figure 2 illustrating another alternative form of the invention, and Figure 7 is a horizontal section taken on the line 7—7 of Figure 6.

Referring to Figures 1 to 4 of the drawings, 10 is a casing which may be formed in two sections 11 and 12 removably secured together in any suitable manner, such as by bolts 13. Casing section 12 has a fluid outlet 15 therein. Casing section 11 has a fluid inlet 17 which, in this example, is in the form of an inlet pipe 18 extending into the casing. The outer end of this pipe may be connected to a fluid pipe, such as a water pipe, in any suitable manner.

Casing section 11 has a large opening 23 therein, and a bell 24 connected to the section, encloses this opening and extends outwardly therefrom. The outer end 25 of the bell extends towards and is connected to pipe 18. This bell forms an annular chamber 26 around the pipe.

A flexible diaphragm 30 formed of any suitable material, such as thin metal, rubber, artificial rubber, or the like, extends across casing 10 between the outlet 15 and inlet 17. In this example, the diaphragm extends between casing sections 11 and 12 and is clamped in position thereby. The diaphragm has a plug 32 projecting outwardly therefrom centrally thereof and facing the inlet 17. This plug may be molded on the diaphragm as shown, or it may be formed of a suitable material and secured to the diaphragm. A seat ring 35 is mounted in the inlet 17 or, in other words, in the inner end of pipe 18, adjacent the plug 32. When the diaphragm is in its unextended position in the casing, the plug is seated on the ring.

Suitable confining means is provided for directing fluid entering the casing through inlet 17 to a small part 37 of the diaphragm. This confining means may be in the form of a flexible bellows 39 secured to or molded with the diaphragm and projecting outwardly therefrom to surround the inner end of pipe 18. A clamping ring 40 secures the outer end of the bellows to the pipe. One or more ports or openings 42, in this example, several ports or openings, are formed through the diaphragm within the confining bellows and around plug 32.

Adjustable and yieldable pressure means is provided in chamber 26 and against the surface of diaphragm 30. In this example, the pressure means is a spring 45 around the inlet pipe 18, the tension of which may be regulated by means of one or more adjustment screws 47 threaded in the outer end of the bell and bearing against a portion of a sleeve 48 resting on the spring, one screw only being shown in the drawings. Alternatively, gas pressure may be used in the bell instead of the spring. In this case, a valve-controlled gas inlet would be provided for chamber 26.

The inner end of pipe 18 and the portion 37 of the diaphragm within the confining means 39 form co-operating elements for controlling the flow of fluid through the valve. Seat 35 is located in the opening of the inner end of the pipe element and plug 32 is located on the diaphragm element.

This pressure reducing valve operates in a very simple manner. Assuming that it is mounted in a water line, water enters the device through pipe 18, and leaves through the outlet 15. A pipe of the water system is, of course, connected to said outlet, and it is assumed that the system has at least one valve or tap in it. The purpose of the pressure reducing valve is to prevent the pressure in the system beyond the outlet 15 from rising above a predetermined point. These valves are needed when the pressure of the water supply thereto is relatively high.

If the tap of the water system is wide open, there is comparatively little back pressure against diaphragm 30 so that the inlet pressure of the water against the part 37 of the diaphragm within bellows 39 plus the pressure of the spring against the diaphragm separates plug 32 from seat 35, at which time water flows through the diaphragm ports or openings 42. If the tap is partially closed, the back pressure against the diaphragm is increased relative to the water pressure on the part 37 of the diaphragm and the pressure of spring 45 against said diaphragm so that plug 32 is moved towards its seat, thereby automatically reducing the flow through the valve. If the tap is closed completely, the back pressure against the large surface of the diaphragm is greater than the fluid pressure against the smaller part of the diaphragm and the spring pressure, at which time plug 32 is pressed on to its seat and stops the flow of water through the pressure valve. Thus, the outlet pressure of the valve cannot rise beyond a predetermined point. This point is determined by the pressure of spring 45, and may be varied by turning the adjustment screw 47 to increase or decrease the spring pressure.

This valve has only one moving part, the flexible diaphragm and its confining means. The amount of pressure against the diaphragm in the direction of the outlet determines the maximum outlet pressure. When a spring is used, the range of the maximum outlet pressure depends upon the mechanical properties of the spring. Different ranges of outlet pressure are obtained by using springs having different compression factors.

The maximum outlet pressure of this valve may be quite close to the inlet pressure thereof due to the fact that the water flows almost straight through the valve, whereas with valves in common use, the direction of flow of the water changes several times.

Figures 6 and 7 illustrate a variation of this invention. In the previously-described form of the invention, the plug was on the diaphragm, and the valve seat fixed in the casing. In Figures 6 and 7, this is reversed, that is, the plug is fixed in the casing, and the seat is on the diaphragm. The inlet pipe and the diaphragm are the only things changed in the latter. In place of pipe 18, there is an inlet pipe 55 having a plug 56 at its inner end. This plug actually closes the inner end of the pipe so that the outlet thereof is in the form of one or more openings 57 opening out laterally therefrom spaced from the plug. These openings are within a bellows 60 projecting upwardly from a diaphragm 61 which is secured in the casing 10 in the same manner as the previously-described diaphragm. Diaphragm 61 has a central port or openings 63 therethrough in line with the plug 56. A seat ring 64 surrounds the port and extends towards the plug. When the diaphragm is in its closed position, the seat ring bears against plug 56.

In this example, the inner end of pipe 55 and the portion of diaphragm 61 within confining means 60 form co-operating elements for controlling the flow of fluid through the valve. Seat 64 is located at the opening 63 in the diaphragm element, and each opening 57 is in the pipe element.

The pressure reducing valve of Figures 6 and 7 operates in the same manner as that of Figures 1 to 4. When the water system is completely closed, the back or outlet pressure of the valve against the large surface of diaphragm 61 balances the inlet pressure against the part of the diaphragm within bellows 60 and the spring pressure. Therefore, the seat ring 64 bears against plug 56 to prevent the flow of fluid through the valve. As one or more taps of the system are opened, the back pressure decreases and the seat ring moves away from the plug to permit the flow of water, of amount of which flow depending upon the outlet pressure.

If the valves of this invention are used in comparatively high pressure systems, it is advisable to provide protection for the diaphragm bellows. In the valve of Figures 6 and 7, a bell shield 70 has been provided for this purpose. It is supported by pipe 55 and fits over bellows 60 to prevent the latter from being extended beyond a safe limit by the inlet pressure of the fluid.

A similar bell shield 73 is shown in broken lines in Figure 2 and in full lines in Figure 5 for the first-described form of this invention.

What I claim as my invention is:

1. A pressure reducing valve comprising a casing, a fluid outlet for the casing, a pipe extending into the casing towards said outlet, said pipe having an inner end terminating at a point clear of the outlet and at least one opening at said inner end forming a fluid inlet for the casing, a flexible diaphragm secured to and extending completely across the casing between the inlet and outlet near the inner end of the pipe, flexible confining means connected to the pipe beyond the inner end thereof and integrally connected to the diaphragm for directing all fluid passing through the inlet against a small part only of said diaphragm, an opening through the diaphragm within the confining means, said pipe inner end and the portion of the diaphragm within the confining means forming co-operating elements for controlling the flow of fluid through the valve, a seat component at the opening in one of said elements, a plug component on the other of said elements positioned to close and open the seat of said one element, the component associated with the diaphragm element being integral with and forming part of the diaphragm, said flexible diaphragm being positioned to keep the plug and seat components together thereby closing the seat component, and yieldable pressure means pressing against the diaphragm in the direction of the casing outlet normally to separate the plug component and the seat component, said diaphragm being moved against the pressure means to keep the plug and seat components together and the seat component closed by back pressure of fluid through the outlet against the diaphragm when the valve is in operation and said back pressure against a large portion of the diaphragm exceeds the combined fluid pressure against the small part thereof within the confining means and the pressure of the pressure means against the diaphragm, and when said back pressure does not exceed said combined pressures the plug and seat components separating to permit fluid to flow through the seat.

2. A pressure reducing valve as claimed in claim 1 in which the inlet opening in the pipe faces the diaphragm and the seat component is in said opening, and the plug component is on the diaphragm within the confining means.

3. A pressure reducing valve as claimed in claim 2 including means for adjusting the pressure of the pressures means against the diaphragm to regulate the outlet pressure of the valve.

4. A pressure reducing valve as claimed in claim 1 in which the inlet opening faces laterally from the pipe, the seat component is at the diaphragm opening, and the plug component is on the inner end of the pipe in line with the diaphragm opening and seat component.

5. A pressure reducing valve as claimed in claim 4 including means for adjusting the pressure of the pressure means against the diaphragm to regulate the outlet pressure of the valve.

6. A pressure reducing valve as claimed in claim 1 including an annular chamber formed around the inlet pipe and communicating with the interior of the casing, said yieldable pressure means being in said chamber.

7. A pressure reducing valve as claimed in claim 1 in which the flexible confining means comprises a bellows integrally connected to the diaphragm, and including means over the outer surface of the bellows to prevent over-extending thereof.

8. A pressure reducing valve as claimed in claim 7 in which the means on the outer surface of the bellows is a bell shield supported in the casing.

References Cited in the file of this patent

UNITED STATES PATENTS

| | | |
|---|---|---|
| 2,429,546 | Boynton | Oct. 21, 1947 |
| 2,608,801 | Ridley | Sept. 2, 1952 |
| 2,657,704 | Fausek | Nov. 3, 1953 |

FOREIGN PATENTS

| | | |
|---|---|---|
| 107,495 | Great Britain | of 1917 |
| 763,351 | France | Feb. 12, 1934 |
| 294,955 | Switzerland | of 1953 |